UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

BLUE DYE AND PROCESS OF MAKING SAME.

No. 818,336.  Specification of Letters Patent.  Patented April 17, 1906.

Application filed October 11, 1905. Serial No. 282,319.

*To all whom it may concern:*

Be it known that we, OSCAR BALLY, a citizen of the Swiss Republic, residing at Mannheim, in the Grand Duchy of Baden, and HUGO WOLFF, a subject of the Grand Duke of Baden, residing at Ludwigshafen-on-the-Rhine, in the Kingdom of Bavaria, German Empire, doctors of philosophy and chemists, have invented new and useful Improvements in Anthracene Dyes and Processes of Making the Same, of which the following is a specification.

New compounds of the anthracene series containing a benzanthrone group can be obtained by condensing certain anthracene compounds with glycerin. (See Letters Patents Nos. 786,085, 787,859, and 798,104.) It has been discovered that these new benzanthrones upon being treated with caustic alkali yield valuable coloring-matters possessing dyeing properties similar to those of indanthrene, and this invention has been described in an application for a patent filed on January 31, 1905, Serial No. 243,571, which contains generic claims for coloring-matters which can be produced by treating a benzanthrone with caustic alkali and also for the process for producing the same.

In the present application we make no generic claim for the production of coloring-matters from benzanthrones and for the coloring-matters themselves; but we wish to claim specifically the coloring-matters obtainable by treating with caustic alkali a benzanthrone which can be obtained by condensing with glycerin a halogen anthracene body (as described in United States Letters Patent No. 809,894, dated January 9, 1906) and the process for production of these coloring-matters. They are soluble in concentrated sulfuric acid, giving violet to brown solutions, and they dissolve in alkaline hydrosulfite, yielding blue to bluish-red vats which dye vegetable fiber, substantively giving violet to blue shades. In particular the coloring-matter obtainable from chlor-benzanthrone yields a blue-red vat with alkaline hydrosulfite.

The following will serve to further illustrate the nature of our invention, which, however, is not confined to this example. The parts are by weight. Introduce one (1) part of chlor-benranthrone (obtained from beta-chlor-anthraquinone and glycerin) into a mixture of four (4) parts of caustic potash and four (4) parts of absolute alcohol at a temperature of one hundred and fifty (150) degrees centigrade and then continue heating for half an hour (thirty minutes) at a temperature of one hundred and eighty (180) degrees centigrade. Allow to cool, boil with water, and filter off and wash the coloring-matter, which when dry is a blue-black powder insoluble in water and in dilute acids and alkalies. It is soluble in concentrated sulfuric acid (the solution being a dull violet-brown) and in twenty-three (23) per cent. oleum, (the solution being a dull brown.) In nitrobenzene and also in quinolin it yields red-violet solutions with a red fluorescence. It dissolves in alkaline hydrosulfite, giving a blue-red vat which dyes vegetable fiber blue-violet, which shades upon washing become blue and very fast.

Now what we claim is—

1. The process for the production of anthracene coloring-matters by treating with caustic alkali a hereinbefore-defined benzanthrone compound obtainable by condensing together a halogen anthracene body and glycerin.

2. The process for the production of anthracene coloring-matter by treating chlor-benzanthrone with caustic alkali.

3. As new articles of manufacture, the anthracene coloring-matters which can be obtained by treating with caustic alkali a benzanthrone obtainable from a halogen anthracene body, which coloring-matters dissolve in concentrated sulfuric acid, yielding violet to brown solutions, and which dissolve in alkaline hydrosulfite yielding blue to bluish-red vats which dye vegetable fiber substantively giving violet to blue shades.

4. As a new article of manufacture the anthracene coloring-matter which can be obtained by treating chlor-benzanthrone with caustic alkali, which coloring-matter dissolves in concentrated sulfuric acid yielding a violet-brown solution, and which dissolves in alkaline hydrosulfite yielding a bluish-red vat which dyes vegetable fiber substantively yielding blue shades.

In testimony whereof we have hereunto set our hands in the presence of two subscribing witnesses.

OSCAR BALLY.
HUGO WOLFF.

Witnesses:
ERNEST F. EHRHARDT,
J. ALEC. LLOYD.

---

Corrections in Letters Patent No. 818,336.

It is hereby certified that in Letters Patent No. 818,336, granted April 17, 1906, upon the application of Oscar Bally, of Mannheim, and Hugo Wolff, of Ludwigshafen-on-the-Rhine, Germany, the title of the invention was erroneously written and printed "Blue Dyes and Processes of Making Same," whereas the said title should have been written and printed *Anthracene Dyes and Processes of Making Same*, and in line 51, page 1, the compound word "chlor-bensanthrone" should read *chlor-benzanthrone;* and that the said Letters Patent should be read with these corrections therein that the same may conform to the record of the case in the Patent Office.

Signed and sealed this 3d day of July, A. D., 1906.

[SEAL.]

E. B. MOORE,
*Acting Commissioner of Patents.* tained by treating chlor-benzanthrone with caustic alkali, which coloring-matter dissolves in concentrated sulfuric acid yielding a violet-brown solution, and which dissolves in alkaline hydrosulfite yielding a bluish-red vat which dyes vegetable fiber substantively yielding blue shades.

In testimony whereof we have hereunto set our hands in the presence of two subscribing witnesses.

OSCAR BALLY.
HUGO WOLFF.

Witnesses:
ERNEST F. EHRHARDT,
J. ALEC. LLOYD.

Corrections in Letters Patent No. 818,336.

It is hereby certified that in Letters Patent No. 818,336, granted April 17, 1906, upon the application of Oscar Bally, of Mannheim, and Hugo Wolff, of Ludwigshafen-on-the-Rhine, Germany, the title of the invention was erroneously written and printed "Blue Dyes and Processes of Making Same," whereas the said title should have been written and printed *Anthracene Dyes and Processes of Making Same*, and in line 51, page 1, the compound word "chlor-bensanthrone" should read *chlor-benzanthrone*; and that the said Letters Patent should be read with these corrections therein that the same may conform to the record of the case in the Patent Office.

Signed and sealed this 3d day of July, A. D., 1906.

[SEAL.]

E. B. MOORE,
*Acting Commissioner of Patents.*

It is hereby certified that in Letters Patent No. 818,336, granted April 17, 1906, upon the application of Oscar Bally, of Mannheim, and Hugo Wolff, of Ludwigshafen-on-the-Rhine, Germany, the title of the invention was erroneously written and printed "Blue Dyes and Processes of Making Same," whereas the said title should have been written and printed *Anthracene Dyes and Processes of Making Same*, and in line 51, page 1, the compound word "chlor-bensanthrone" should read *chlor-benzanthrone;* and that the said Letters Patent should be read with these corrections therein that the same may conform to the record of the case in the Patent Office.

Signed and sealed this 3d day of July, A. D., 1906.

[SEAL.]

E. B. MOORE,
*Acting Commissioner of Patents.*